US012795674B2

(12) United States Patent
Qiao et al.

(10) Patent No.: US 12,795,674 B2
(45) Date of Patent: Nov. 10, 2026

(54) TRANSMISSION CONTROL METHOD AND APPARATUS, COMMUNICATION APPARATUS, AND STORAGE MEDIUM

(71) Applicant: Beijing Xiaomi Mobile Software Co., Ltd., Beijing (CN)

(72) Inventors: Xuemei Qiao, Beijing (CN); Yumin Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 262 days.

(21) Appl. No.: 18/727,301

(22) PCT Filed: Jan. 10, 2022

(86) PCT No.: PCT/CN2022/071101
§ 371 (c)(1),
(2) Date: Jul. 8, 2024

(87) PCT Pub. No.: WO2023/130466
PCT Pub. Date: Jul. 13, 2023

(65) Prior Publication Data

US 2025/0097947 A1 Mar. 20, 2025

(51) Int. Cl.
*H04W 72/21* (2023.01)
*H04W 72/0446* (2023.01)

(52) U.S. Cl.
CPC ....... *H04W 72/21* (2023.01); *H04W 72/0446* (2013.01)

(58) Field of Classification Search
CPC ............. H04W 72/21; H04W 72/0446; H04W 72/1268; H04W 72/23
See application file for complete search history.

(56) References Cited

U.S. PATENT DOCUMENTS

2020/0146034 A1* 5/2020 Bagheri ................ H04L 1/1822
2020/0260398 A1* 8/2020 Jiang .................. H04W 72/535

FOREIGN PATENT DOCUMENTS

| | | | |
|---|---|---|---|
| CN | 104144506 | A | 11/2014 |
| CN | 104519562 | A | 4/2015 |
| CN | 105531953 | A | 4/2016 |
| CN | 113273286 | A | 8/2021 |
| WO | 2020032695 | A1 | 2/2020 |

OTHER PUBLICATIONS

"Joint channel estimation for PUSCH," Proceedings of the 3GPP TSG RAN WG1 #106b-e, InterDigital, Inc., R1-2110154, Oct. 11, 2021, e-Meeting, 12 pages.

* cited by examiner

*Primary Examiner* — Mohammad S Anwar
(74) *Attorney, Agent, or Firm* — McCoy Russell LLP

(57) ABSTRACT

A transmission control method includes: transmitting uplink information to a network device over a plurality of slots based on TB processing over multi-slot PUSCH (TBoMS); and terminating transmission of the uplink information over the plurality of slots based on the TBoMS in response to receiving an early-termination-of-transmission indication transmitted by the network device.

18 Claims, 5 Drawing Sheets

TRANSMISSION CONTROL METHOD AND APPARATUS, COMMUNICATION APPARATUS, AND STORAGE MEDIUM

CROSS-REFERENCE TO RELATED APPLICATION

The present application is a U.S. National Stage of International Application No. PCT/CN2022/071101, filed on Jan. 10, 2022, the contents of all of which are incorporated herein by reference in their entireties for all purposes.

BACKGROUND OF THE INVENTION

In related art, TB processing over multi-slot PUSCH (TBoMS) is proposed to deal with the situation of relatively weak coverage. For example, week coverage occurs when a terminal is at the edge of a cell.

Based on TBoMS transmission, for a Transport Block (TB) to be transmitted, the terminal may perform addition of Cyclic Redundancy Check (CRC) bits and encoding of Low Density Parity Check (LDPC) codes across the entire TB at a physical layer.

After LDPC encoding, for a plurality of slots used by the TBoMS transmission, rate matching, scrambling, modulation, precoding, resource mapping, and modulation of Orthogonal Frequency Division Multiplexing (OFDM) symbol may be performed for each slot. Rate matching for each slot may be performed by performing rate matching for a next slot at an end position of a bit corresponding to one slot.

SUMMARY OF THE INVENTION

The present disclosure relates to the field of communication technologies, and in particular, to a transmission control method, a transmission control apparatus, a communication apparatus, and a computer-readable storage medium.

According to a first aspect of the embodiments of the present disclosure, a transmission control method is provided, which is performed by a terminal. The transmission control method includes: transmitting uplink information to a network device over a plurality of slots based on TB processing over multi-slot PUSCH (TBoMS); and terminating transmission of the uplink information over the plurality of slots based on the TBoMS in response to receiving an early-termination-of-transmission indication transmitted by the network device.

According to a second aspect of the embodiments of the present disclosure, a transmission control method is provided, which is performed by a network device. The transmission control method includes: receiving uplink information transmitted, based on TB processing over multi-slot PUSCH (TBoMS), by a terminal over a plurality of slots; decoding, upon receiving uplink information from partial slots of the plurality of slots, the uplink information from the partial slots; and transmitting, in response to decoding the uplink information from the partial slots successfully, an early-termination-of-transmission indication to the terminal, to indicate the terminal to terminate the transmission of the uplink information over the plurality of slots based on the TBoMS.

According to a third aspect of the embodiments of the present disclosure, a transmission control apparatus is provided. The transmission control apparatus includes: a transmission module, configured to transmit uplink information to a network device over a plurality of slots based on TB processing over multi-slot PUSCH (TBoMS); and a processing module, configured to terminate transmission of the uplink information over the plurality of slots based on the TBoMS in response to receiving an early-termination-of-transmission indication transmitted by the network device.

According to a fourth aspect of the embodiments of the present disclosure, a transmission control apparatus is provided, which is applied to a network device. The transmission control apparatus includes: a receiving module, configured to receive uplink information transmitted, based on TB processing over multi-slot PUSCH (TBoMS), by a terminal over a plurality of slots; a processing module, configured to decode, upon receiving uplink information from partial slots of the plurality of slots, the uplink information from the partial slots; and a transmission module, configured to transmit, in response to decoding the uplink information from the partial slots successfully, an early-termination-of-transmission indication to the terminal, to indicate the terminal to terminate the transmission of the uplink information over the plurality of slots based on the TBoMS.

According to a fifth aspect of the embodiments of the present disclosure, a communication apparatus is provided, including: a processor; and a memory configured to store a computer program, where the computer program, when executed by the processor, implements the transmission control method performed by a terminal.

According to a sixth aspect of the embodiments of the present disclosure, a communication apparatus is provided, including: a processor; and a memory configured to store a computer program, where the computer program, when executed by the processor, implements the transmission control method performed by a network device.

According to a seventh aspect of the embodiments of the present disclosure, there is provided a non-transitory computer-readable storage medium, storing a computer program which, when executed by a processor, causes the processor to implement the steps in the transmission control method performed by a terminal.

According to an eighth aspect of the embodiments of the present disclosure, there is provided a non-transitory computer-readable storage medium, storing a computer program which, when executed by a processor, causes the processor to implement the steps in the transmission control method performed by a network device.

BRIEF DESCRIPTION OF DRAWINGS

In order to more clearly illustrate the technical solutions of the embodiments of the present disclosure, the accompanying drawings required for the description of the embodiments will be briefly introduced below. Apparently, the accompanying drawings described below are merely some embodiments of the present disclosure, and a person of ordinary skill in the art may still derive other drawings from these accompanying drawings without making any creative efforts.

DETAILED DESCRIPTION OF THE INVENTION

The technical solutions according to the embodiments of the present disclosure are clearly and completely described below with reference to the accompanying drawings. The embodiments described are merely part, rather than all of the embodiments of the present disclosure. All other embodiments obtained by a person of ordinary skill in the art based on the embodiments of the present disclosure, without making any creative efforts shall fall within the protection scope of the present disclosure.

The terms used in the embodiments of the present disclosure are merely for the purpose of describing specific embodiments, and are not intended to limit the embodiments of the present disclosure. The singular forms of "a" and "the" used in the embodiments of the present disclosure and the appended claims are also intended to include plural forms, unless other meanings are clearly indicated in the context. It is to be understood that the term "and/or" used in the disclosure refers to and includes any or all possible combinations of one or more associated listed items.

It is to be understood that although terms such as first, second, and third may be used in the embodiments of the present disclosure to describe a variety of information, such information should not be limited to these terms. These terms are merely used to distinguish the same type of information from each other. For example, without departing from the scope of the embodiments of the present disclosure, first information may also be referred to as second information, and similarly, second information may also be referred to as first information. Depending on the context, the term "if" used in the disclosure can be interpreted as "when", "while", or "in response to determining".

For the purpose of simplicity and ease of understanding, the terms used in the disclosure to characterize size relationships are "greater than" or "less than", and "higher than" or "lower than". However, for a person skilled in the art, it can be understood that, the term "greater than" also covers the meaning of "greater than or equal to", and "less than" also covers the meaning of "less than or equal to"; and the term "higher than" also covers the meaning of "higher than or equal to", and "lower than" also covers the meaning of "lower than or equal to".

In related art, a network device may receive uplink information transmitted, based on the TBoMS, by a terminal over a plurality of slots and decode the uplink information after completing the reception over the plurality of slots. However, this may lead to a waste of terminal resources in some cases.

Figure 1:
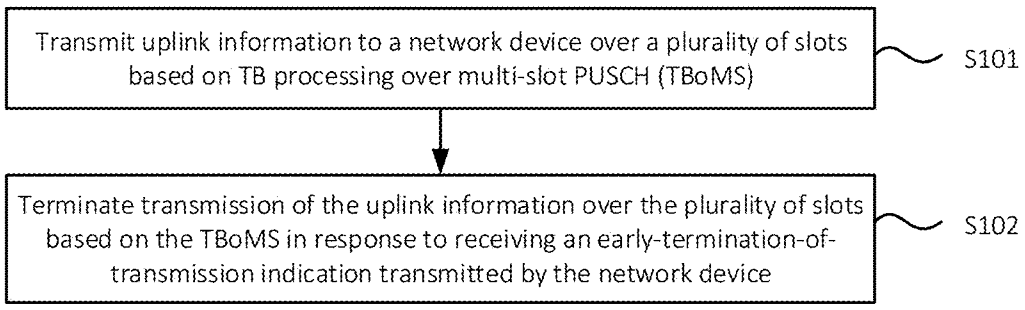
FIG. 1 is a schematic flowchart of a transmission control method according to an embodiment of the present disclosure.

FIG. 1 is a schematic flowchart of a transmission control method according to an embodiment of the present disclosure. The transmission control method may be performed by a terminal. The terminal includes, but is not limited to, a communication apparatus such as a mobile phone, a tablet computer, a wearable device, a sensor, or an Internet of Things device. The terminal may communicate with a network device. The network device includes, but is not limited to, a network device in a communication system such as 4G, 5G, or 6G, e.g., a base station or a core network.

As shown in FIG. 1, the transmission control method may include steps S101 and S102.

Step S101 includes transmitting uplink information, such as physical uplink share channel (PUSCH), to a network device over a plurality of slots based on TB processing over multi-slot PUSCH (TBoMS).

Step S102 includes terminating transmission of the uplink information over the plurality of slots based on the TBoMS in response to receiving an early-termination-of-transmission indication transmitted by the network device.

In an embodiment, the network device may configure the terminal to transmit uplink information based on the TBoMS. A number of slots occupied by the TBoMS may be pre-agreed or may be configured or indicated by the network device.

For example, the network device configures the terminal to transmit the uplink information based on the TBoMS, and configures the number of slots occupied by the TBoMS to be n, and the terminal may transmit uplink information to the network device over the n slots based on the TBoMS.

In an embodiment, the network device may determine, according to channel state information (CSI) reported by the terminal, whether to configure or indicate the terminal to transmit, based on the TBoMS, uplink Information. For example, the network device may configure or indicate the terminal to transmit, based on the TBoMS, uplink information in a case that a channel state is determined to be relatively poor according to the CSI, and the terminal may transmit uplink information to the network device over a plurality of slots occupied by the TBoMS. Alternatively, the network device may not configure or indicate the terminal to transmit, based on the TBoMS, uplink information in a case that the channel state is determined to be relatively good according to the CSI, and the terminal may transmit uplink information on a resource configured by the network device for the uplink information.

However, for some cases, such as a case where an actual coverage condition of the terminal is good but inaccurate CSI measurement results in the network device determining, based on the CSI, a relatively poor channel state, or a case where the terminal is not at the edge of a cell, the terminal is configured or indicated to transmit the uplink information based on the TBoMS.

Because the actual coverage condition of the terminal is relatively good in these cases, the network device may perform decoding (further including CRC checking) successfully after receiving the uplink information transmitted by the terminal over partial slots of the plurality of slots occupied by the TBoMS. After the network device decodes the uplink information successfully, the network device obtains the uplink information successfully, and then the terminal does not need to continue to transmit the uplink information in subsequent slots. If the terminal continues to transmit the uplink information over other slots of the plurality of slots occupied by the TBoMS, a waste of terminal resources (such as unnecessary power consumption) is caused, and a waste of frequency domain resources may also occur because uplink transmission needs to occupy frequency domain resources.

According to the embodiments of the present disclosure, in a case of configuring the terminal to transmit uplink information based on the TBoMS, the network device may receive the uplink information transmitted by the terminal over a plurality of slots based on the TBoMS. The plurality of slots are slots occupied by the TBoMS, which may be configured or indicated by the network device, or may be agreed based on a protocol.

After receiving uplink information from partial slots of the plurality of slots, the network device performs decoding (including decoding and CRC checking) on the uplink information from the partial slots, and may transmit an early-termination-of-transmission indication to the terminal after decoding the uplink information from the partial slots successfully, to indicate the terminal to terminate the transmission of the uplink information over the plurality of slots based on the TBoMS.

Correspondingly, during transmitting the uplink information over the plurality of slots based on the TBoMS, the terminal may terminate continuing to transmit the uplink information over the plurality of slots based on the TBoMS after receiving the early-termination-of-transmission indication transmitted by the network device.

For example, the plurality of slots are n slots, and the network device may decode the received information after receiving the uplink information from an $i^{th}$ slot, or decode the received information once every time the uplink information from i slots is received, where n is an integer greater than 1 and i is an integer greater than 0 and less than n.

In a case that the information is decoded successfully, the network device may transmit an early-termination-of-transmission indication to the terminal, and the terminal may terminate continuing to transmit the uplink information over the plurality of slots based on the TBoMS after receiving the early-termination-of-transmission indication. In this way, a waste of terminal resources can be avoided, and a waste of spectrum resources can also be avoided.

For example, the terminal receives the early-termination-of-transmission indication over an $(i+1)^{th}$ slot, and the terminal may terminate the transmission of the uplink information to the network device over the $(i+1)^{th}$ slot to the $n^{th}$ slot based on the TBoMS, so that resources for transmitting the uplink information over the $(i+1)^{th}$ slot to the $n^{th}$ slot are saved.

It is to be noted that, the terminal may immediately terminate continuing to transmit the uplink information over the plurality of slots based on the TBoMS upon receiving the early-termination-of-transmission indication, or terminate continuing to transmit the uplink information over the plurality of slots based on the TBoMS after a first number of time units after receiving the early-termination-of-transmission indication.

In addition, the method according to the embodiments of the disclosure may be applicable to a scenario in which the terminal performs single TBoMS, or a scenario in which the TBoMS is performed repeatedly, e.g., a scenario of TBoMS with repetition.

In the scenario in which the TBoMS is performed repeatedly, for each TBoMS, the network device may decode the uplink information from the partial slots of the plurality of slots upon receiving the uplink information from the partial slots of the plurality of slots, and then transmit an early-termination-of-transmission indication to the terminal after decoding the uplink information from the partial slots successfully. The terminal may terminate continuing to transmit the uplink information over the plurality of slots based on the TBoMS even all repetitions of the TBoMS are not completed.

Figure 2:
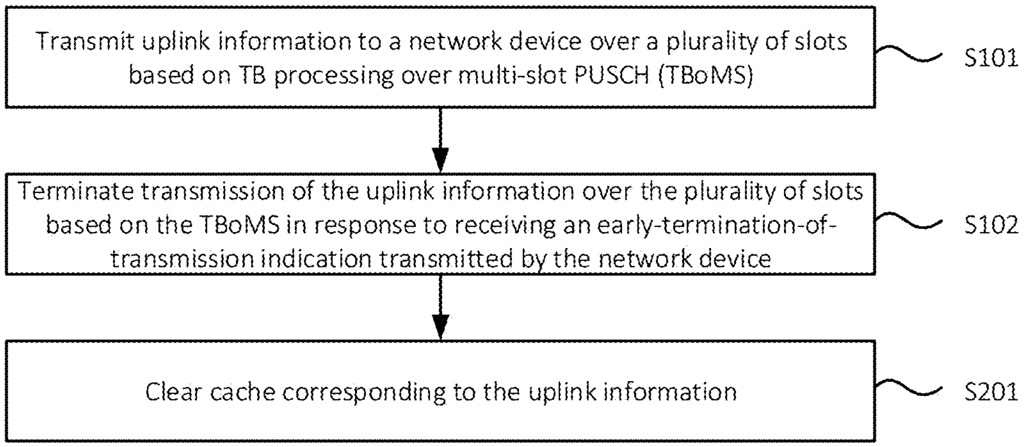
FIG. 2 is a schematic flowchart of another transmission control method according to an embodiment of the present disclosure.

FIG. 2 is a schematic flowchart of another transmission control method according to an embodiment of the present disclosure. As shown in FIG. 2, the transmission control method further includes step S201.

Step S201 includes clearing cache corresponding to the uplink information.

In an embodiment, the terminal receives an early-termination-of-transmission indication, and terminates continuing to transmit the uplink information over the plurality of slots based on the TBoMS. The terminal may further clear cache corresponding to the uplink information because the transmission of the uplink information has been terminated, thereby saving cache space.

Figure 3:
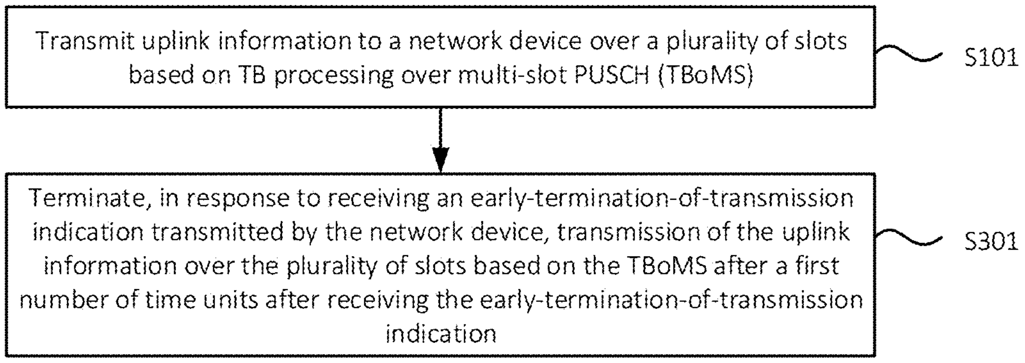
FIG. 3 is a schematic flowchart of still another transmission control method according to an embodiment of the present disclosure.

FIG. 3 is a schematic flowchart of still another transmission control method according to an embodiment of the present disclosure. As shown in FIG. 3, terminating the transmission of the uplink information over the plurality of slots based on the TBoMS includes step S301.

Step S301 includes terminating the transmission of the uplink information over the plurality of slots based on the TBoMS after a first number of time units after receiving the early-termination-of-transmission indication.

In an embodiment, the terminal terminates the transmission of the uplink information over the plurality of slots based on the TBoMS upon receiving the early-termination-of-transmission indication, which may specifically include: terminating the transmission of the uplink information over the plurality of slots based on the TBoMS after the first number of time units (e.g., K time units for short) after receiving the early-termination-of-transmission indication, so that the terminal can perform some operations within the first number of time units.

The time unit includes, but is not limited to, an OFDM symbol, a slot, a subframe, or the like. The time unit may be configured by the network device or agreed based on a protocol.

In an embodiment, the method further includes:

operations performed within the first number of time units including, but are not limited to, at least one of:

processing the early-termination-of-transmission indication at at least one of a higher layer or a physical layer;

parsing the early-termination-of-transmission indication, where the early-termination-of-transmission indication may be indication information or signaling;

clearing cache corresponding to the uplink information; or cancelling preparation for transmitting, after the first number of time units after receiving the early-termination-of-transmission indication, the uplink information over the plurality of slots based on the TBoMS.

In an embodiment, the terminal may process the early-termination-of-transmission indication at at least one of a higher layer or a physical layer within K time units after receiving the early-termination-of-transmission indication.

For example, the early-termination-of-transmission indication is carried in a Physical Downlink Control Channel (PDCCH), the terminal needs to perform blind detection on the PDCCH at the physical layer to obtain the early-termination-of-transmission indication.

In an embodiment, the terminal parses the early-termination-of-transmission indication within K time units after receiving the early-termination-of-transmission indication, so as to determine the meaning of the early-termination-of-transmission indication.

In an embodiment, the terminal may clear the cache corresponding to the uplink information within K time units after receiving the early-termination-of-transmission indication, thereby saving the cache space.

In an embodiment, during transmitting the uplink information over the plurality of slots based on the TBoMS, after transmitting the uplink information over one slot, the terminal needs to make some preparation, e.g., phase adjustment, for transmitting the uplink information over subsequent slots. After the early-termination-of-transmission indication is received, there is no need to continue transmitting the uplink information in the subsequent slots, the preparation for transmitting the uplink information in the subsequent slots may be cancelled, e.g., the adjusted phase is restored, so as to avoid affecting newly transmitted data subsequently. For example, the terminal terminates the transmission of the uplink information over the plurality of slots based on the TBoMS after K time units after receiving the early-termination-of-transmission indication, and the terminal can cancel, within the K time units, the preparation for transmitting, after K time units after receiving the early-termination-of-transmission indication, the uplink information over the plurality of slots based on the TBoMS.

In an embodiment, the first number is determined according to at least one of:

a configuration by the network device;

a protocol-based agreement; or a capability of the terminal.

The terminal terminates the transmission of the uplink information over the plurality of slots based on the TBoMS after K time units after receiving the early-termination-of-transmission indication, where a value of K may be configured by the network device; or may be agreed by the terminal according to a protocol; or may be determined by the terminal according to a capability of the terminal.

Figure 4:
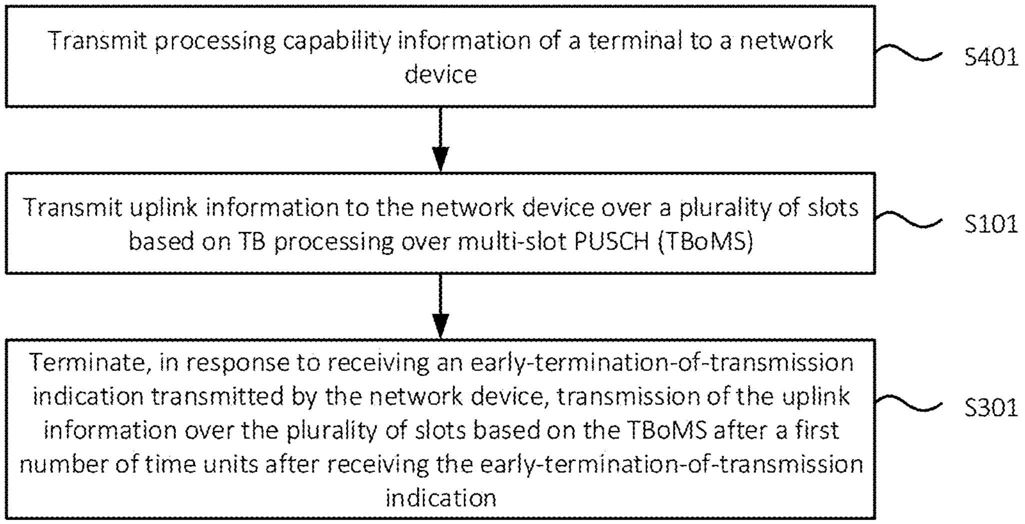
FIG. 4 is a schematic flowchart of still another transmission control method according to an embodiment of the present disclosure.

FIG. 4 is a schematic flowchart of still another transmission control method according to an embodiment of the present disclosure. As shown in FIG. 4, the first number is determined according to the configuration by the network device, and the method further includes step S401.

Step S401 includes transmitting processing capability information of the terminal to the network device.

In an embodiment, during configuring the value of K, the network device may determine the value of K according to a processing capability of the terminal and then configure the value of K for the terminal. In this case, the terminal may first report the processing capability information of the terminal itself to the network device, so that the network device may determine the value of K according to the processing capability of the terminal.

The processing capability information may include a generalized processing capability, such as a processing rate of a processor. Alternatively, the processing capability information may include a specific processing capability, e.g., a rate at which the terminal parses the early-termination-of-transmission indication, a rate at which the terminal clears the cache corresponding to the uplink information, a rate at which the terminal cancels the preparation for transmitting, after the first number of time units after receiving the early-termination-of-transmission indication, the uplink information over the plurality of slots based on the TBoMS, or the like.

By reporting the specific processing capability, it is beneficial for the network device to configure the value of K for the terminal more accurately. For reporting a specific processing capability, the terminal may first determine an operation to be performed within the first number of time units and then report a capability corresponding to the operation. For example, the terminal needs to parse the early-termination-of-transmission indication within the first number of time units, and the rate at which the terminal pares the early-termination-of-transmission indication may be reported. For example, the terminal needs to clear the cache corresponding to the uplink information within the first number of time units, and the rate at which the terminal clears the cache corresponding to the uplink information may be reported. In this way, the value of K configured by the network device for the terminal matches the operation to be performed by the terminal within the first number of time units, thereby meeting requirements of the operation.

In an embodiment, the early-termination-of-transmission indication is carried in at least one of:

downlink control information (DCI);

a media access control control element (MAC CE); or a hybrid automatic repeat request acknowledge (HARQ-ACK) signaling.

It is to be noted that, the HARQ-ACK may be transmitted using a separate feedback channel or carried in DCI. For example, for feedback performed for configured grant uplink transmission in an unlicensed spectrum, the HARQ-ACK is carried in DCI format 0_1.

In an embodiment, the network device may transmit the early-termination-of-transmission indication to the terminal by carrying the early-termination-of-transmission indication in the DCI, or transmit the early-termination-of-transmission indication to the terminal by carrying the early-termination-of-transmission indication in the MAC CE, or transmit the early-termination-of-transmission indication to the terminal by carrying the early-termination-of-transmission indication in the HARQ-ACK.

In a case that the early-termination-of-transmission indication is carried in the DCI, the early-termination-of-transmission indication may include one or more information fields in the DCI, e.g., may include an HARQ process number (HPN) field. In a case that the early-termination-of-transmission indication is carried in the MAC CE, the early-termination-of-transmission indication may include one or more fields in the MAC CE. In a case that the early-termination-of-transmission indication is carried in the HARQ-ACK, the early-termination-of-transmission indication may include one or more fields in the HARQ-ACK.

The following embodiments describe the embodiments of the present disclosure by examples mainly for the case that the early-termination-of-transmission indication is carried in the DCI.

Figure 5:
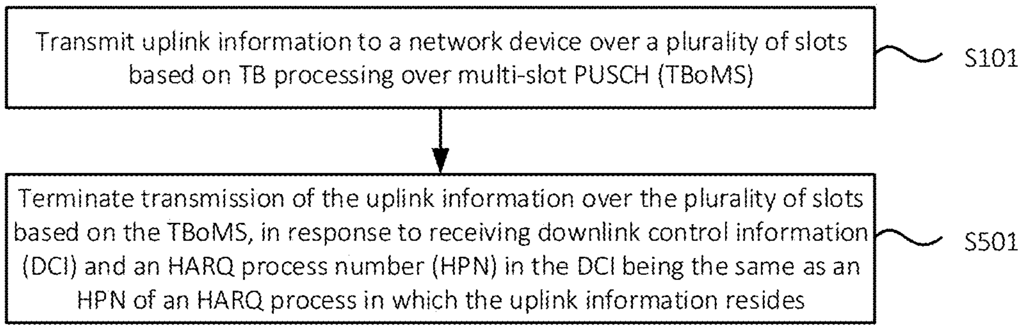
FIG. 5 is a schematic flowchart of still another transmission control method according to an embodiment of the present disclosure.

FIG. 5 is a schematic flowchart of still another transmission control method according to an embodiment of the present disclosure. As shown in FIG. 5, the early-termination-of-transmission indication is carried in the DCI, and terminating the transmission of the uplink information over the plurality of slots based on the TBoMS in response to receiving the early-termination-of-transmission indication transmitted by the network device includes step S501.

Step S501 includes terminating the transmission of the uplink information over the plurality of slots based on the TBoMS, in response to receiving the DCI and an HARQ process number (HPN) in the DCI being the same as an HPN of an HARQ process in which the uplink information resides.

In an embodiment, in a case that the network device uses the DCI to carry the early-termination-of-transmission indication, the early-termination-of-transmission indication may include an HPN field in the DCI. In this case, the DCI may be DCI for scheduling.

For example, in a case of using the HPN field as the early-termination-of-transmission indication, the network device may first determine an HPN (e.g., referred to as a first HPN) of an HARQ process in which the uplink information that the terminal transmits to the network device over the plurality of slots based on the TBoMS resides. Then, in a case that the network device needs to indicate the terminal to terminate transmitting the uplink information to the network device over the plurality of slots based on the TBoMS, the network device may set the HPN in the DCI (e.g., referred to as a second HPN) to be the same as the first HPN.

Further, after receiving the DCI, the terminal may determine whether the second HPN in the DCI is the same as the first HPN. In a case that the second HPN is the same as the first HPN, the terminal may determine the second HPN as the early-termination-of-transmission indication, and then terminate the transmission of the uplink information over the plurality of slots based on the TBoMS. In a case that the second HPN is different from the first HPN, the terminal may not take the second HPN as the early-termination-of-transmission indication, and continue to transmit the uplink information over the plurality of slots based on the TBoMS.

In an embodiment, terminating the transmission of the uplink information over the plurality of slots based on the TBoMS, in response to receiving the DCI and the HPN in the DCI being the same as the HPN of the HARQ process in which the uplink information resides includes:

terminating the transmission of the uplink information over the plurality of slots based on the TBoMS, in response to receiving the DCI, the HPN in the DCI being the same as the HPN of the HARQ process in which the uplink information resides, and a new data indicator (NDI) field in the DCI being flipped.

In an embodiment, in a case that the network device uses the DCI to carry the early-termination-of-transmission indication, the early-termination-of-transmission indication may include not only the HPN field in the DCI, but also the NDI field in the DCI.

For example, the terminal may maintain a NDI parameter for each HARQ process. In a case that the early-termination-of-transmission indication includes an HPN field and an NDI field, the network device may first determine an HPN (e.g., referred to as a first HPN) of an HARQ process in which the uplink information that the terminal transmits to the network device over the plurality of slots based on the TBoMS resides, and determine an NDI corresponding to the HARQ process in which the uplink information that the terminal transmits to the network device over the plurality of slots based on the TBoMS resides. Then, in a case that the network device needs to indicate the terminal to terminate the transmission of the uplink information to the network device over the plurality of slots based on the TBoMS, the network device may set an HPN (e.g., referred to as a second HPN) in the DCI to be the same as the first HPN, and may set (a value of) an NDI field in the DCI to be the opposite of, i.e., flipped relative to, the NDI parameter maintained by the terminal.

Further, after receiving the DCI, the terminal may determine whether the second HPN in the DCI is the same as the first HPN. In a case that the second HPN is the same as the first HPN and the NDI field is flipped relative to a maintained NDI parameter, the terminal may terminate the transmission of the uplink information over the plurality of slots based on the TBoMS. In a case that the second HPN is different from the first HPN, or the NDI field in the DCI is not flipped relative to the maintained NDI parameter, the terminal may continue to transmit the uplink information over the plurality of slots based on the TBoMS. In a case that the second HPN is the same as the first HPN, and the NDI field in the DCI is not flipped relative to the maintained NDI parameter, the terminal may transmit the uplink information over the plurality of slots based on the TBoMS again, that is, retransmit the uplink information over the plurality of slots based on the TBoMS.

In an embodiment, the method further includes determining scheduling information for new data transmission according to the DCI.

In a case that the network device uses the DCI to carry the early-termination-of-transmission indication, the DCI may be a DCI for scheduling, and the scheduling information for new data transmission may be carried in the DCI. The terminal may determine a resource (including at least one of a time domain resource or a frequency domain resource) for new data transmission according to the scheduling information, and then may transmit new data on the determined resource. It is to be noted that, the DCI does not necessarily carry the scheduling information, or may not carry the scheduling information.

In an embodiment, the DCI includes at least one of:

DCI of a new format, dedicated to indicate the terminal to terminate the transmission of the uplink information over the plurality of slots based on the TBoMS; or legacy DCI, where a new bit or a reserved bit or a legacy indicator field (such as HPN, NDI, or HARQ-ACK) in the legacy DCI is used to indicate the terminal to terminate the transmission of the uplink information over the plurality of slots based on the TBoMS.

In an embodiment, in a case that the network device uses the DCI to carry the early-termination-of-transmission indication, DCI of a new format may be set, and the DCI of a new format may be dedicated as the early-termination-of-transmission indication to specially indicate the terminal to terminate the transmission of the uplink information over the plurality of slots based on the TBoMS. After receiving the DCI of a new format, the terminal may determine, according to the DCI of a new format, whether to terminate the transmission of the uplink information over the plurality of slots based on the TBoMS.

For example, in a case that the terminal is indicated by the DCI of a new format, one or more information fields in the DCI of a new format may be used to indicate the terminal whether to terminate the transmission of the uplink information over the plurality of slots based on the TBoMS. For example, the terminal may terminate the transmission of the uplink information over the plurality of slots based on the TBoMS upon receiving the DCI of a new format, and the terminal does not terminate the transmission of the uplink information over the plurality of slots based on the TBoMS upon not receiving the DCI of a new format.

For example, in a case that the terminal is indicated by DCI of a plurality of new formats, the terminal may be indicated, according to DCI of one of the plurality of new formats, to terminate the transmission of the uplink information over the plurality of slots based on the TBoMS, and the terminal may be indicated, according to DCI of another one of the plurality of new formats, to not terminate the transmission of the uplink information over the plurality of slots based on the TBoMS.

In an embodiment, legacy DCI may be used in a case that the network device uses the DCI to carry the early-termination-of-transmission indication. For example, a new bit may be set in the legacy DCI to indicate the terminal to terminate the transmission of the uplink information over the plurality of slots based on the TBoMS. After receiving the legacy DCI, the terminal may determine, according to the new bit in the legacy DCI, whether to terminate the transmission of the uplink information over the plurality of slots based on the TBoMS.

The legacy DCI may be used in a case that the network device uses the DCI to carry the early-termination-of-transmission indication. For example, a reserved bit in the legacy DCI may be used to indicate the terminal to terminate the transmission of the uplink information over the plurality of slots based on the TBoMS. After receiving the legacy DCI, the terminal may determine, according to the reserved bit in the legacy DCI, whether to terminate the transmission of the uplink information over the plurality of slots based on the TBoMS.

In an embodiment, the MAC CE includes at least one of:

a new MAC CE, dedicated to indicate the terminal to terminate the transmission of the uplink information over the plurality of slots based on the TBoMS; or a legacy MAC CE, where a new bit or a reserved bit in the legacy MAC CE is used to indicate the terminal to terminate the transmission of the uplink information over the plurality of slots based on the TBoMS.

In an embodiment, in a case that the network device uses the MAC CE to carry the early-termination-of-transmission indication, a new MAC CE may be set, and the new MAC CE may be dedicated as the early-termination-of-transmission indication to specially indicate the terminal to terminate the transmission of the uplink information over the plurality of slots based on the TBoMS. After receiving the new MAC CE, the terminal may determine, according to the new MAC CE, whether to terminate the transmission of the uplink information over the plurality of slots based on the TBoMS.

For example, for a new MAC CE, a dedicated logical channel identifier (LCID) may be set in a subheader of the MAC CE, to identify the MAC CE as a new MAC CE. Correspondingly, after receiving the MAC CE, the terminal may determine, according to the LCID in the subheader, whether the MAC CE is a new MAC CE, and after determining that the MAC CE is a new MAC CE, the terminal may determine, according to the new MAC CE, whether to terminate the transmission of the uplink information over the plurality of slots based on the TBoMS.

In an embodiment, a legacy MAC CE may be used in a case that the network device uses the MAC CE to carry the early-termination-of-transmission indication. For example, a new bit may be set in the legacy MAC CE to indicate the terminal to terminate the transmission of the uplink information over the plurality of slots based on the TBoMS. After receiving the legacy MAC CE, the terminal may determine, according to the new bit in the legacy MAC CE, whether to terminate the transmission of the uplink information over the plurality of slots based on the TBoMS.

The legacy MAC CE may be used in a case that the network device uses the MAC CE to carry the early-termination-of-transmission indication. For example, a reserved bit in the legacy MAC CE may be used to indicate the terminal to terminate the transmission of the uplink information over the plurality of slots based on the TBoMS. After receiving the legacy MAC CE, the terminal may determine, according to the reserved bit in the legacy MAC CE, whether to terminate the transmission of the uplink information over the plurality of slots based on the TBoMS.

In an embodiment, the transmission of the uplink information over the plurality of slots based on the TBoMS is performed on a first resource. The first resource includes at least one of:

a configured grant (CG) resource; or a dynamic scheduling resource.

In an embodiment, a frequency domain resource in the configured grant resource includes at least one of:

a frequency domain resource in an unlicensed spectrum; or a frequency domain resource in a licensed spectrum.

In an embodiment, the first resource occupied by an operation of transmitting, by the terminal, the uplink information over the plurality of slots based on the TBoMS may be a CG resource in an unlicensed spectrum, a CG resource in a licensed spectrum, or a dynamic scheduling resource.

Correspondingly, for the operation of transmitting by the terminal, on any of the first resources, the uplink information over the plurality of slots based on the TBoMS, the network device may indicate, through the early-termination-of-transmission indication, the terminal to terminate the transmission of the uplink information over the plurality of slots based on the TBoMS.

For example, in a case that the terminal transmits, on a CG resource in an unlicensed spectrum, the uplink information over the plurality of slots based on the TBoMS, the network device may indicate, through an HARQ-ACK, the terminal to terminate the transmission of the uplink information over the plurality of slots based on the TBoMS.

In a case that the terminal transmits, on a CG resource in a licensed spectrum, the uplink information over the plurality of slots based on the TBoMS, the network device may also indicate, through the HARQ-ACK, the terminal to terminate the transmission of the uplink information over the plurality of slots based on the TBoMS.

In a case that the terminal transmits, on a dynamic scheduling resource, the uplink information over the plurality of slots based on the TBoMS, the network device may also indicate, through the HARQ-ACK, the terminal to terminate the transmission of the uplink information over the plurality of slots based on the TBoMS.

It needs to be noted that, a specific manner selected by the network device to indicate the terminal to terminate the transmission of the uplink information over the plurality of slots based on the TBoMS may be specified in a protocol, configured by a base station, or determined according to needs.

Further, the network device may select, according to at least one a type or a scheduling manner of the first resource occupied by the transmission, by the terminal, of the uplink information over the plurality of slots based on the TBoMS, corresponding manner to indicate the terminal to terminate the transmission of the uplink information over the plurality of slots based on the TBoMS.

For example, in a case that the terminal transmits, on a CG resource in an unlicensed spectrum, the uplink information over the plurality of slots based on the TBoMS, the network device may indicate, through an HARQ-ACK, the terminal to terminate the transmission of the uplink information over the plurality of slots based on the TBoMS. In a case that the terminal transmits, on a CG resource in a licensed spectrum, the uplink information over the plurality of slots based on the TBoMS, the network device may indicate, through the DCI or the MAC CE, the terminal to terminate the transmission of the uplink information over the plurality of slots based on the TBoMS. Since there is currently an HARQ ACK/NACK mechanism for an operation of transmitting the uplink information on the CG resource in the unlicensed spectrum, but there is no HARQ ACK/NACK mechanism for an operation of transmitting the uplink information on the CG resource in the licensed spectrum, it is possible for the embodiments of the disclosure to reduce the adjustment for the existing mechanism and to lower the difficulty of application.

Figure 6:
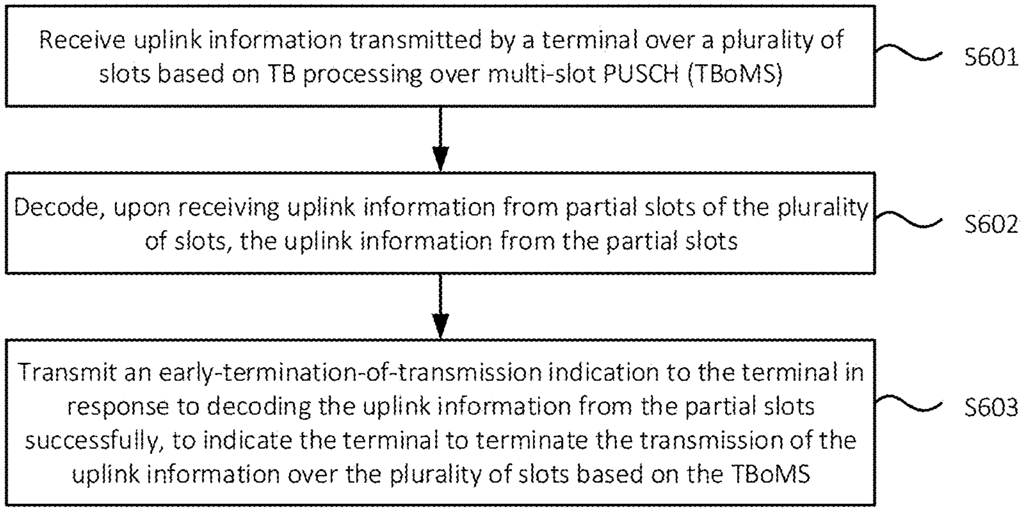
FIG. 6 is a schematic flowchart of a transmission control method according to an embodiment of the present disclosure.

FIG. 6 is a schematic flowchart of a transmission control method according to an embodiment of the present disclosure. The transmission control method may be performed by a network device. The network device may communicate with a terminal. The terminal includes, but is not limited to, a communication apparatus such as a mobile phone, a tablet computer, a wearable device, a sensor, or an Internet of Things device. The network device includes, but is not limited to, a network device in a communication system such as 4G, 5G, or 6G, e.g., a base station or a core network.

As shown in FIG. 6, the transmission control method may include steps S601, S602 and S603.

Step S601 includes receiving uplink information transmitted by a terminal over a plurality of slots based on TB processing over multi-slot PUSCH (TBoMS).

Step S602 includes decoding, after receiving uplink information from partial slots of the plurality of slots, the uplink information from the partial slots.

Step S603 includes transmitting, in response to decoding the uplink information from the partial slots successfully, an early-termination-of-transmission indication to the terminal, to indicate the terminal to terminate the transmission of the uplink information over the plurality of slots based on the TBoMS.

In an embodiment, the network device may configure the terminal to transmit the uplink information based on the TBoMS. A number of slots occupied by the TBoMS may be pre-agreed or may be configured or indicated by the network device.

For example, the network device configures the terminal to transmit uplink information based on the TBoMS, and configures the number of slots occupied by the TBoMS to be n. In this case, the terminal may transmit the uplink information to the network device over the n slots based on the TBoMS.

In an embodiment, the network device may determine, according to channel state information (CSI) reported by the terminal, whether to configure or indicate the terminal to transmit the uplink Information based on the TBoMS. For example, the network device may configure or indicate the terminal to transmit the uplink information based on the TBoMS in a case that a channel state is determined to be relatively poor according to the CSI, and then the terminal may transmit the uplink information to the network device over the plurality of slots occupied by the TBoMS. Further, the network device may not configure or indicate the terminal to transmit the uplink information based on the TBoMS in a case that the channel state is determined to be relatively good according to the CSI, and then the terminal may transmit the uplink information on a resource configured by the network device for the uplink information.

However, for some cases, such as a case where an actual coverage condition of the terminal is good but inaccurate CSI measurement results in the network device determining, based on the CSI, a relatively poor channel state, or a case where the terminal is not at the edge of a cell, the terminal is configured or indicated to transmit the uplink information based on the TBoMS.

Because the actual coverage condition of the terminal is relatively good in these cases, the network device may perform decoding (further including CRC checking) successfully after receiving the uplink information transmitted by the terminal over partial slots of the plurality of slots occupied by the TBoMS. After the network device decodes the uplink information successfully, the network device obtains the uplink information successfully, and then the terminal does not need to continue to transmit the uplink information in subsequent slots. If the terminal continues to transmit the uplink information over other slots of the plurality of slots occupied by the TBoMS, a waste of terminal resources (such as unnecessary power consumption) is caused, and a waste of frequency domain resources may also occur because uplink transmission needs to occupy frequency domain resources.

According to the embodiments of the present disclosure, in a case of configuring the terminal to transmit uplink information based on the TBoMS, the network device may receive the uplink information transmitted by the terminal over a plurality of slots based on the TBoMS. The plurality of slots are slots occupied by the TBoMS, which may be configured or indicated by the network device, or may be agreed based on a protocol.

After receiving uplink information from partial slots of the plurality of slots, the network device performs decoding (including decoding and CRC checking) on the uplink information from the partial slots, and may transmit an early-termination-of-transmission indication to the terminal after decoding the uplink information from the partial slots successfully, to indicate the terminal to terminate the transmission of the uplink information over the plurality of slots based on the TBoMS.

Correspondingly, during transmitting the uplink information over the plurality of slots based on the TBoMS, the terminal may terminate continuing to transmit the uplink information over the plurality of slots based on the TBoMS after receiving the early-termination-of-transmission indication transmitted by the network device.

For example, the plurality of slots are n slots, and the network device may decode the received information after receiving the uplink information from an $i^{th}$ slot, or decode the received information once every time the uplink information from i slots is received, where n is an integer greater than 1 and i is an integer greater than 0 and less than n.

In a case that the information is decoded successfully, the network device may transmit an early-termination-of-transmission indication to the terminal, and the terminal may terminate continuing to transmit the uplink information over the plurality of slots based on the TBoMS after receiving the early-termination-of-transmission indication. In this way, a waste of terminal resources can be avoided, and a waste of spectrum resources can also be avoided.

For example, the terminal receives the early-termination-of-transmission indication over an $(i+1)^{th}$ slot, and the terminal may terminate the transmission of the uplink information to the network device over the $(i+1)^{th}$ slot to the $n^{th}$ slot based on the TBoMS, so that resources for transmitting the uplink information over the $(i+1)^{th}$ slot to the $n^{th}$ slot are saved.

It is to be noted that, the terminal may immediately terminate continuing to transmit the uplink information over the plurality of slots based on the TBoMS upon receiving the early-termination-of-transmission indication, or terminate continuing to transmit the uplink information over the plurality of slots based on the TBoMS after a first number of time units after receiving the early-termination-of-transmission indication.

In addition, the method according to the embodiments of the disclosure may be applicable to a scenario in which the terminal performs single TBoMS, or a scenario in which the TBoMS is performed repeatedly, e.g., a scenario of TBoMS with repetition.

In the scenario in which the TBoMS is performed repeatedly, for each TBoMS, the network device may decode the uplink information from the partial slots of the plurality of slots upon receiving the uplink information from the partial slots of the plurality of slots, and then transmit an early-termination-of-transmission indication to the terminal after decoding the uplink information from the partial slots successfully. The terminal may terminate continuing to transmit the uplink information over the plurality of slots based on the TBoMS even all repetitions of the TBoMS are not completed.

Figure 7:
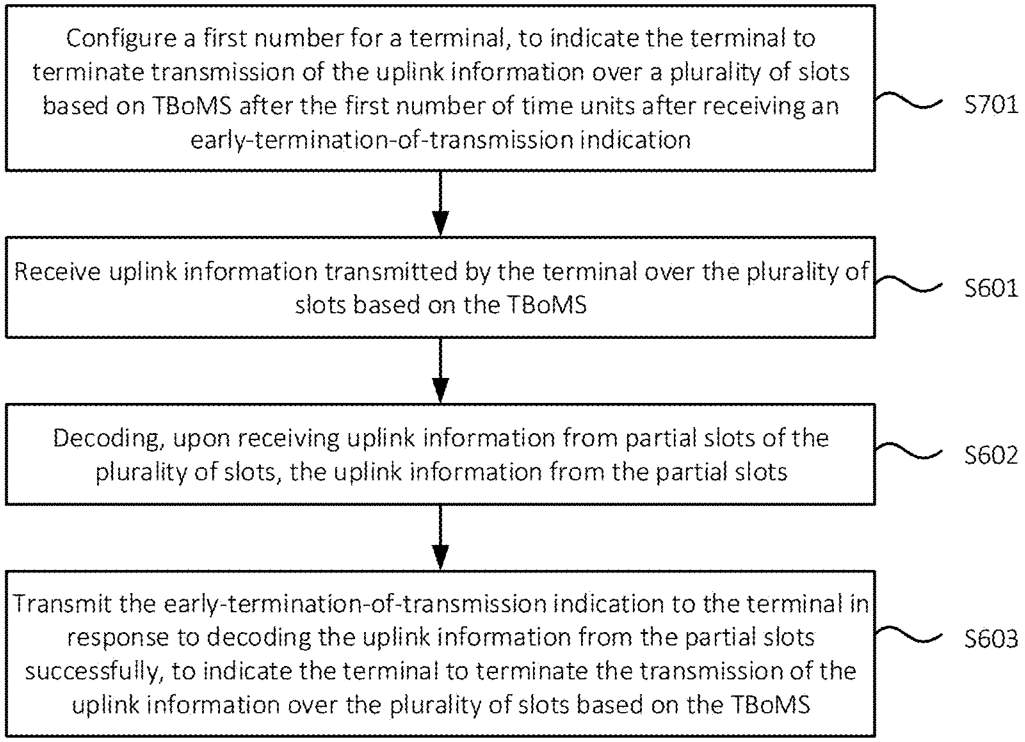
FIG. 7 is a schematic flowchart of another transmission control method according to an embodiment of the present disclosure.

FIG. 7 is a schematic flowchart of another transmission control method according to an embodiment of the present disclosure. As shown in FIG. 7, the transmission control method further includes step S701.

Step S701 includes configuring a first number of time units for the terminal, to indicate the terminal to terminate the transmission of the uplink information over the plurality of slots based on the TBoMS after the first number of time units after receiving the early-termination-of-transmission indication.

In an embodiment, the terminal terminates the transmission of the uplink information over the plurality of slots based on the TBoMS upon receiving the early-termination-of-transmission indication, which may specifically include: terminating the transmission of the uplink information over the plurality of slots based on the TBoMS after the first number of time units (e.g., K time units for short) after receiving the early-termination-of-transmission indication, so that the terminal can perform some operations within the first number of time units.

The time unit includes, but is not limited to, an OFDM symbol, a slot, a subframe, or the like. The time unit may be configured by the network device or agreed based on a protocol. A value of K may also be configured by the network device.

In an embodiment, the method further includes:

receiving processing capability information transmitted by the terminal, where the first number is determined based on the processing capability information.

In an embodiment, during configuring the value of K, the network device may determine the value of K according to a processing capability of the terminal and then configure the value of K for the terminal. In this case, the terminal may first report the processing capability information of the terminal itself to the network device, so that the network device may determine the value of K according to the processing capability of the terminal.

The processing capability information may include a generalized processing capability, such as a processing rate of a processor. Alternatively, the processing capability information may include a specific processing capability, e.g., a rate at which the terminal parses the early-termination-of-transmission indication, a rate at which the terminal clears the cache corresponding to the uplink information, a rate at which the terminal cancels the preparation for transmitting, after the first number of time units after receiving the early-termination-of-transmission indication, the uplink information over the plurality of slots based on the TBoMS, or the like.

By reporting the specific processing capability, it is beneficial for the network device to configure the value of K for the terminal more accurately. For reporting a specific processing capability, the terminal may first determine an operation to be performed within the first number of time units and then report a capability corresponding to the operation. For example, the terminal needs to parse the early-termination-of-transmission indication within the first number of time units, and the rate at which the terminal pares the early-termination-of-transmission indication may be reported. For example, the terminal needs to clear the cache corresponding to the uplink information within the first number of time units, and the rate at which the terminal clears the cache corresponding to the uplink information may be reported. In this way, the value of K configured by the network device for the terminal matches the operation to be performed by the terminal within the first number of time units, thereby meeting requirements of the operation.

In an embodiment, the early-termination-of-transmission indication is carried in at least one of:

downlink control information (DCI);

a media access control control element (MAC CE); or a hybrid automatic repeat request acknowledge (HARQ-ACK) signaling.

It is to be noted that, the HARQ-ACK may be transmitted using a separate feedback channel or carried in DCI. For example, for feedback performed for configured grant uplink transmission in an unlicensed spectrum, the HARQ-ACK is carried in DCI format 0_1.

In an embodiment, the network device may transmit the early-termination-of-transmission indication to the terminal by carrying the early-termination-of-transmission indication in the DCI, or transmit the early-termination-of-transmission indication to the terminal by carrying the early-termination-of-transmission indication in the MAC CE, or transmit the early-termination-of-transmission indication to the terminal by carrying the early-termination-of-transmission indication in the HARQ-ACK.

In a case that the early-termination-of-transmission indication is carried in the DCI, the early-termination-of-transmission indication may include one or more information fields in the DCI, e.g., may include an HARQ process number (HPN) field. In a case that the early-termination-of-transmission indication is carried in the MAC CE, the early-termination-of-transmission indication may include one or more fields in the MAC CE. In a case that the early-termination-of-transmission indication is carried in the HARQ-ACK, the early-termination-of-transmission indication may include one or more fields in the HARQ-ACK.

The following embodiments describe the embodiments of the present disclosure by examples mainly for the case that the early-termination-of-transmission indication is carried in the DCI.

In an embodiment, an HPN in the DCI is the same as an HPN of an HARQ process in which the uplink information resides.

In an embodiment, in a case that the network device uses the DCI to carry the early-termination-of-transmission indication, the early-termination-of-transmission indication may include an HPN field in the DCI. In this case, the DCI may be DCI for scheduling.

For example, in a case of using the HPN field as the early-termination-of-transmission indication, the network device may first determine an HPN (e.g., referred to as a first HPN) of an HARQ process in which the uplink information that the terminal transmits to the network device over the plurality of slots based on the TBoMS resides. Then, in a case that the network device needs to indicate the terminal to terminate transmitting the uplink information to the network device over the plurality of slots based on the TBoMS, the network device may set the HPN in the DCI (e.g., referred to as a second HPN) to be the same as the first HPN.

Further, after receiving the DCI, the terminal may determine whether the second HPN in the DCI is the same as the first HPN. In a case that the second HPN is the same as the first HPN, the terminal may determine the second HPN as the early-termination-of-transmission indication, and then terminate the transmission of the uplink information over the plurality of slots based on the TBoMS. In a case that the second HPN is different from the first HPN, the terminal may not take the second HPN as the early-termination-of-transmission indication, and continue to transmit the uplink information over the plurality of slots based on the TBoMS.

In an embodiment, a new data indicator (NDI) field in the DCI is flipped.

In an embodiment, in a case that the network device uses the DCI to carry the early-termination-of-transmission indication, the early-termination-of-transmission indication may include not only the HPN field in the DCI, but also the NDI field in the DCI.

For example, the terminal may maintain a NDI parameter for each HARQ process. In a case that the early-termination-of-transmission indication includes an HPN field and an NDI field, the network device may first determine an HPN (e.g., referred to as a first HPN) of an HARQ process in which the uplink information that the terminal transmits to the network device over the plurality of slots based on the TBoMS resides, and determine an NDI corresponding to the HARQ process in which the uplink information that the terminal transmits to the network device over the plurality of slots based on the TBoMS resides. Then, in a case that the network device needs to indicate the terminal to terminate the transmission of the uplink information to the network device over the plurality of slots based on the TBoMS, the network device may set an HPN (e.g., referred to as a second HPN) in the DCI to be the same as the first HPN, and may set (a value of) an NDI field in the DCI to be the opposite of, i.e., flipped relative to, the NDI parameter maintained by the terminal.

Further, after receiving the DCI, the terminal may determine whether the second HPN in the DCI is the same as the first HPN. In a case that the second HPN is the same as the first HPN and the NDI field is flipped relative to a maintained NDI parameter, the terminal may terminate the transmission of the uplink information over the plurality of slots based on the TBoMS. In a case that the second HPN is different from the first HPN, or the NDI field in the DCI is not flipped relative to the maintained NDI parameter, the terminal may continue to transmit the uplink information over the plurality of slots based on the TBoMS. In a case that the second HPN is the same as the first HPN, and the NDI field in the DCI is not flipped relative to the maintained NDI parameter, the terminal may transmit the uplink information over the plurality of slots based on the TBoMS again, that is, retransmit the uplink information over the plurality of slots based on the TBoMS.

In an embodiment, scheduling information for new data transmission is carried or not carried in the DCI.

In a case that the network device uses the DCI to carry the early-termination-of-transmission indication, the DCI may be a DCI for scheduling, and the scheduling information for new data transmission may be carried in the DCI. The terminal may determine a resource (including at least one of a time domain resource or a frequency domain resource) for new data transmission according to the scheduling information, and then may transmit new data on the determined resource. It is to be noted that, the DCI does not necessarily carry the scheduling information, or may not carry the scheduling information.

In an embodiment, the DCI includes at least one of:

DCI of a new format, dedicated to indicate the terminal to terminate the transmission of the uplink information over the plurality of slots based on the TBoMS; or legacy DCI, where a new bit or a reserved bit or a legacy indicator field (such as HPN, NDI, or HARQ-ACK) in the legacy DCI is used to indicate the terminal to terminate the transmission of the uplink information over the plurality of slots based on the TBoMS.

In an embodiment, in a case that the network device uses the DCI to carry the early-termination-of-transmission indication, DCI of a new format may be set, and the DCI of a new format may be dedicated as the early-termination-of-transmission indication to specially indicate the terminal to terminate the transmission of the uplink information over the plurality of slots based on the TBoMS. After receiving the DCI of a new format, the terminal may determine, according to the DCI of a new format, whether to terminate the transmission of the uplink information over the plurality of slots based on the TBoMS.

For example, in a case that the terminal is indicated by the DCI of a new format, one or more information fields in the DCI of a new format may be used to indicate the terminal whether to terminate the transmission of the uplink information over the plurality of slots based on the TBoMS. For example, the terminal may terminate the transmission of the uplink information over the plurality of slots based on the TBoMS upon receiving the DCI of a new format, and the terminal does not terminate the transmission of the uplink information over the plurality of slots based on the TBoMS upon not receiving the DCI of a new format.

For example, in a case that the terminal is indicated by DCI of a plurality of new formats, the terminal may be indicated, according to DCI of one of the plurality of new formats, to terminate the transmission of the uplink information over the plurality of slots based on the TBoMS, and the terminal may be indicated, according to DCI of another one of the plurality of new formats, to not terminate the transmission of the uplink information over the plurality of slots based on the TBoMS.

In an embodiment, legacy DCI may be used in a case that the network device uses the DCI to carry the early-termination-of-transmission indication. For example, a new bit may be set in the legacy DCI to indicate the terminal to terminate the transmission of the uplink information over the plurality of slots based on the TBoMS. After receiving the legacy DCI, the terminal may determine, according to the new bit in the legacy DCI, whether to terminate the transmission of the uplink information over the plurality of slots based on the TBoMS.

The legacy DCI may be used in a case that the network device uses the DCI to carry the early-termination-of-transmission indication. For example, a reserved bit in the legacy DCI may be used to indicate the terminal to terminate the transmission of the uplink information over the plurality of slots based on the TBoMS. After receiving the legacy DCI, the terminal may determine, according to the reserved bit in the legacy DCI, whether to terminate the transmission of the uplink information over the plurality of slots based on the TBoMS.

In an embodiment, the MAC CE includes at least one of:

a new MAC CE, dedicated to indicate the terminal to terminate the transmission of the uplink information over the plurality of slots based on the TBoMS; or a legacy MAC CE, where a new bit or a reserved bit in the legacy MAC CE is used to indicate the terminal to terminate the transmission of the uplink information over the plurality of slots based on the TBoMS.

In an embodiment, in a case that the network device uses the MAC CE to carry the early-termination-of-transmission indication, a new MAC CE may be set, and the new MAC CE may be dedicated as the early-termination-of-transmission indication to specially indicate the terminal to terminate the transmission of the uplink information over the plurality of slots based on the TBoMS. After receiving the new MAC CE, the terminal may determine, according to the new MAC CE, whether to terminate the transmission of the uplink information over the plurality of slots based on the TBoMS.

For example, for a new MAC CE, a dedicated logical channel identifier (LCID) may be set in a subheader of the MAC CE, to identify the MAC CE as a new MAC CE. Correspondingly, after receiving the MAC CE, the terminal may determine, according to the LCID in the subheader, whether the MAC CE is a new MAC CE, and after determining that the MAC CE is a new MAC CE, the terminal may determine, according to the new MAC CE, whether to terminate the transmission of the uplink information over the plurality of slots based on the TBoMS.

In an embodiment, a legacy MAC CE may be used in a case that the network device uses the MAC CE to carry the early-termination-of-transmission indication. For example, a new bit may be set in the legacy MAC CE to indicate the terminal to terminate the transmission of the uplink information over the plurality of slots based on the TBoMS. After receiving the legacy MAC CE, the terminal may determine, according to the new bit in the legacy MAC CE, whether to terminate the transmission of the uplink information over the plurality of slots based on the TBoMS.

The legacy MAC CE may be used in a case that the network device uses the MAC CE to carry the early-termination-of-transmission indication. For example, a reserved bit in the legacy MAC CE may be used to indicate the terminal to terminate the transmission of the uplink information over the plurality of slots based on the TBoMS. After receiving the legacy MAC CE, the terminal may determine, according to the reserved bit in the legacy MAC CE, whether to terminate the transmission of the uplink information over the plurality of slots based on the TBoMS.

In an embodiment, the transmission, by the terminal, of the uplink information over the plurality of slots based on the TBoMS is performed on a first resource. The first resource includes at least one of:

a configured grant resource; or a dynamic scheduling resource.

In an embodiment, a frequency domain resource in the configured grant resource includes at least one of:

a frequency domain resource in an unlicensed spectrum; or a frequency domain resource in a licensed spectrum.

In an embodiment, the first resource occupied by an operation of transmitting, by the terminal, the uplink information over the plurality of slots based on the TBoMS may be a CG resource in an unlicensed spectrum, a CG resource in a licensed spectrum, or a dynamic scheduling resource.

Correspondingly, for the operation of transmitting by the terminal, on any of the first resources, the uplink information over the plurality of slots based on the TBoMS, the network device may indicate, through the early-termination-of-transmission indication, the terminal to terminate the transmission of the uplink information over the plurality of slots based on the TBoMS.

For example, in a case that the terminal transmits, on a CG resource in an unlicensed spectrum, the uplink information over the plurality of slots based on the TBoMS, the network device may indicate, through an HARQ-ACK, the terminal to terminate the transmission of the uplink information over the plurality of slots based on the TBoMS.

In a case that the terminal transmits, on a CG resource in a licensed spectrum, the uplink information over the plurality of slots based on the TBoMS, the network device may also indicate, through the HARQ-ACK, the terminal to terminate the transmission of the uplink information over the plurality of slots based on the TBoMS.

In a case that the terminal transmits, on a dynamic scheduling resource, the uplink information over the plurality of slots based on the TBoMS, the network device may also indicate, through the HARQ-ACK, the terminal to terminate the transmission of the uplink information over the plurality of slots based on the TBoMS.

It needs to be noted that, a specific manner selected by the network device to indicate the terminal to terminate the transmission of the uplink information over the plurality of slots based on the TBoMS may be specified in a protocol, configured by a base station, or determined according to needs.

Further, the network device may select, according to at least one a type or a scheduling manner of the first resource occupied by the transmission, by the terminal, of the uplink information over the plurality of slots based on the TBoMS, corresponding manner to indicate the terminal to terminate the transmission of the uplink information over the plurality of slots based on the TBoMS.

For example, in a case that the terminal transmits, on a CG resource in an unlicensed spectrum, the uplink information over the plurality of slots based on the TBoMS, the network device may indicate, through the HARQ-ACK, the terminal to terminate the transmission of the uplink information over the plurality of slots based on the TBoMS. In a case that the terminal transmits, on a CG resource in a licensed spectrum, the uplink information over the plurality of slots based on the TBoMS, the network device may indicate, through the DCI or the MAC CE, the terminal to terminate the transmission of the uplink information over the plurality of slots based on the TBoMS. Since there is currently an HARQ ACK/NACK mechanism for an operation of transmitting the uplink information on the CG resource in the unlicensed spectrum, but there is no HARQ ACK/NACK mechanism for an operation of transmitting the uplink information on the CG resource in the licensed spectrum, it is possible for the embodiments of the disclosure to reduce the adjustment for the existing mechanism and to lower the difficulty of application.

Corresponding to the embodiments of the transmission control method, the present disclosure further provides embodiments of a transmission control apparatus.

Figure 8:
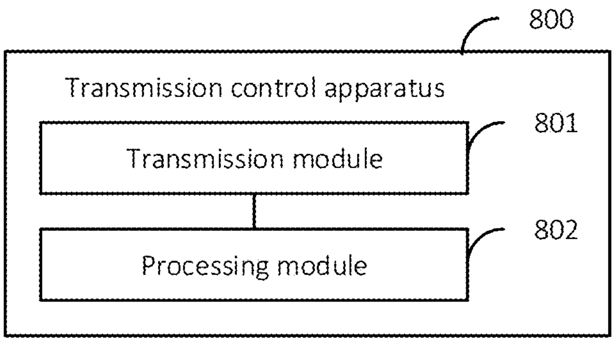
FIG. 8 is a schematic block diagram of a transmission control apparatus according to an embodiment of the present disclosure.

FIG. 8 is a schematic block diagram of a transmission control apparatus according to an embodiment of the present disclosure. The transmission control apparatus 800 may be applicable to a terminal. The terminal includes, but is not limited to, a communication apparatus such as a mobile phone, a tablet computer, a wearable device, a sensor, or an Internet of Things device. The terminal may communicate with a network device. The network device includes, but is not limited to, a network device in a communication system such as 4G, 5G, or 6G, e.g., a base station or a core network.

As shown in FIG. 8, the transmission control apparatus 800 may include a transmission module 801 and a processing module 802.

The transmission module 801 is configured to transmit uplink information to a network device over a plurality of slots based on TB processing over multi-slot PUSCH (TBoMS).

The processing module 802 is configured to terminate transmission of the uplink information over the plurality of slots based on the TBoMS in response to receiving an early-termination-of-transmission indication transmitted by the network device.

In an embodiment, the processing module 802 is further configured to clear cache corresponding to the uplink information.

In an embodiment, the processing module 802 is configured to terminate the transmission of the uplink information over the plurality of slots based on the TBoMS after a first number of time units after receiving the early-termination-of-transmission indication.

In an embodiment, the processing module 802 is further configured to:

perform at least one of the following operations within a first number of time units:

processing the early-termination-of-transmission indication at at least one of a higher layer or a physical layer;

parsing the early-termination-of-transmission indication;

clearing cache corresponding to the uplink information; or cancelling preparation for transmitting, after the first number of time units after receiving the early-termination-of-transmission indication, the uplink information over the plurality of slots based on the TBoMS.

In an embodiment, the first number is determined according to at least one of:

a configuration by the network device;

a protocol-based agreement; or a capability of the terminal.

In an embodiment, the first number is determined according to the configuration by the network device, and the transmission module 801 is further configured to transmit processing capability information of the terminal to the network device.

In an embodiment, the early-termination-of-transmission indication is carried in at least one of:

downlink control information (DCI);

a media access control control element (MAC CE); or a hybrid automatic repeat request acknowledge (HARQ-ACK) signaling.

In an embodiment, the early-termination-of-transmission indication is carried in the DCI, and the processing module 802 is configured to terminate the transmission of the uplink information over the plurality of slots based on the TBoMS, in response to receiving the DCI and an HARQ process number (HPN) in the DCI being the same as an HPN of an HARQ process in which the uplink information resides.

In an embodiment, the processing module 802 is configured to terminate the transmission of the uplink information over the plurality of slots based on the TBoMS, in response to receiving the DCI, the HPN in the DCI being the same as the HPN of the HARQ process in which the uplink information resides, and a new data indicator (NDI) field in the DCI being flipped.

In an embodiment, the processing module 802 is further configured to determine scheduling information for new data transmission according to the DCI.

In an embodiment, the DCI includes at least one of:

DCI of a new format, dedicated to indicate the terminal to terminate the transmission of the uplink information over the plurality of slots based on the TBoMS; or legacy DCI, where a new bit or a reserved bit in the legacy DCI is used to indicate the terminal to terminate the transmission of the uplink information over the plurality of slots based on the TBoMS.

In an embodiment, the MAC CE includes at least one of:

a new MAC CE, dedicated to indicate the terminal to terminate the transmission of the uplink information over the plurality of slots based on the TBoMS; or a legacy MAC CE, where a new bit or a reserved bit in the legacy MAC CE is used to indicate the terminal to terminate the transmission of the uplink information over the plurality of slots based on the TBoMS.

In an embodiment, the transmission of the uplink information over the plurality of slots based on the TBoMS is performed on a first resource. The first resource includes at least one of:

a configured grant resource; or a dynamic scheduling resource.

In an embodiment, a frequency domain resource in the configured grant resource includes at least one of:

a frequency domain resource in an unlicensed spectrum; or a frequency domain resource in a licensed spectrum.

Figure 9:
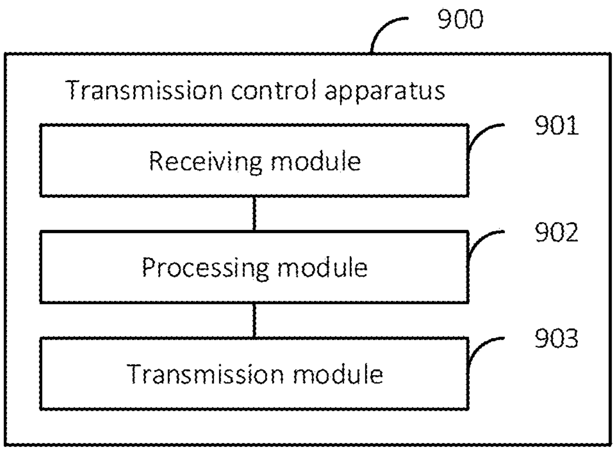
FIG. 9 is a schematic block diagram of a transmission control apparatus according to an embodiment of the present disclosure.

FIG. 9 is a schematic block diagram of a transmission control apparatus according to an embodiment of the present disclosure. The transmission control 900 apparatus may be applicable to a network device. The network device may communicate with a terminal. The terminal includes, but is not limited to, a communication apparatus such as a mobile phone, a tablet computer, a wearable device, a sensor, or an Internet of Things device. The network device includes, but is not limited to, a network device in a communication system such as 4G, 5G, or 6G, e.g., a base station or a core network.

As shown in FIG. 9, the transmission control apparatus 900 may include a receiving module 901, a processing module 902 and a transmission module 903.

The receiving module 901 is configured to receive uplink information transmitted by a terminal over a plurality of slots based on TB processing over multi-slot PUSCH (TBoMS).

The processing module 902 is configured to decode, upon receiving uplink information from partial slots of the plurality of slots, the uplink information from the partial slots.

The transmission module 903 is configured to transmit, in response to decoding the uplink information from the partial slots successfully, an early-termination-of-transmission indication to the terminal, to indicate the terminal to terminate the transmission of the uplink information over the plurality of slots based on the TBoMS.

In an embodiment, the transmission module 903 is further configured to configure a first number of time units for the terminal, to indicate the terminal to terminate the transmission of the uplink information over the plurality of slots based on the TBoMS after the first number of time units after receiving the early-termination-of-transmission indication.

In an embodiment, the receiving module 901 is further configured to receive processing capability information transmitted by the terminal, where the first number is determined based on the processing capability information.

In an embodiment, the early-termination-of-transmission indication is carried in at least one of:

downlink control information (DCI);

a media access control control element (MAC CE); or a hybrid automatic repeat request acknowledge (HARQ-ACK) signaling.

In an embodiment, a HARQ process number (HPN) in the DCI is the same as an HPN of an HARQ process in which the uplink information resides.

In an embodiment, a new data indicator (NDI) field in the DCI is flipped.

In an embodiment, the DCI carries scheduling information for new data transmission or does not carry scheduling information for new data transmission.

In an embodiment, the DCI includes at least one of:

DCI of a new format, dedicated to indicate the terminal to terminate the transmission of the uplink information over the plurality of slots based on the TBoMS; or legacy DCI, where a new bit or a reserved bit in the legacy DCI is used to indicate the terminal to terminate the transmission of the uplink information over the plurality of slots based on the TBoMS.

In an embodiment, the MAC CE includes at least one of:

a new MAC CE, dedicated to indicate the terminal to terminate the transmission of the uplink information over the plurality of slots based on the TBoMS; or a legacy MAC CE, where a new bit or a reserved bit in the legacy MAC CE is used to indicate the terminal to terminate the transmission of the uplink information over the plurality of slots based on the TBoMS.

In an embodiment, the transmission, by the terminal, of the uplink information over the plurality of slots based on the TBoMS is performed on a first resource. The first resource includes at least one of:

a configured grant resource; or a dynamic scheduling resource.

In an embodiment, a frequency domain resource in the configured grant resource includes at least one of:

a frequency domain resource in an unlicensed spectrum; or a frequency domain resource in a licensed spectrum.

The specific manners in which the modules in the apparatus according to the embodiments perform operations have been described in detail in related method embodiments and will not be described in detail herein.

Since the apparatus embodiment basically corresponds to the method embodiment, reference may be made to partial description of the method embodiment for relevant parts. The apparatus embodiments described are schematic, where the modules described as separated components may or may not be physically separated and the components shown as modules may or may not be physical modules, that is, may be located in one place or may be distributed to a plurality of network modules. Some or all of the modules may be selected according to actual needs to achieve the purpose of the embodiments. A person of ordinary skill in the art can understand and implement the present disclosure without making any creative efforts.

An embodiment of the present disclosure further provides a communication apparatus, including: a processor; and a memory configured to store a computer program, where the computer program, when executed by the processor, implements the transmission control method performed by a terminal according to any one of the embodiments.

An embodiment of the present disclosure further provides a communication apparatus, including: a processor; and a memory configured to store a computer program, where the computer program, when executed by the processor, implements the transmission control method performed by a network device according to any one of the embodiments.

An embodiment of the present disclosure further provides a non-transitory computer-readable storage medium, storing a computer program which, when executed by a processor, causes the processor to implement the steps in the transmission control method performed by a terminal according to any one of the embodiments.

An embodiment of the present disclosure further provides a non-transitory computer-readable storage medium, storing a computer program which, when executed by a processor, causes the processor to implement the steps in the transmission control method performed by a network device according to any one of the embodiments.

Figure 10:
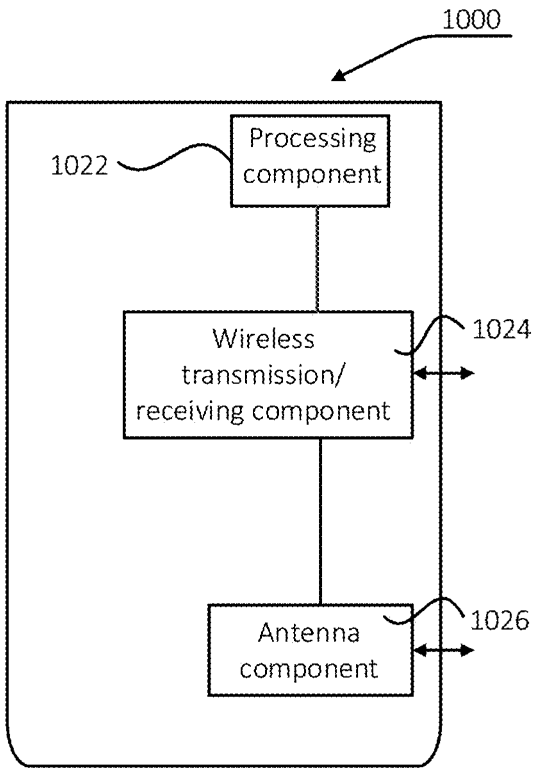
FIG. 10 is a schematic block diagram of an apparatus for transmission control according to an embodiment of the present disclosure.

As shown in FIG. 10, FIG. 10 is a schematic block diagram of an apparatus 1000 for transmission control according to an embodiment of the present disclosure. The apparatus 1000 may be provided as a base station. Referring to FIG. 10, the apparatus 1000 includes a processing component 1022, a wireless transmission/receiving component 1024, an antenna component 1026, and a signal processing part specific to a wireless interface. The processing component 1022 may further include one or more processors. One processor in the processing component 1022 may be configured to implement the transmission control method performed by a network device according to any one of the embodiments.

Figure 11:
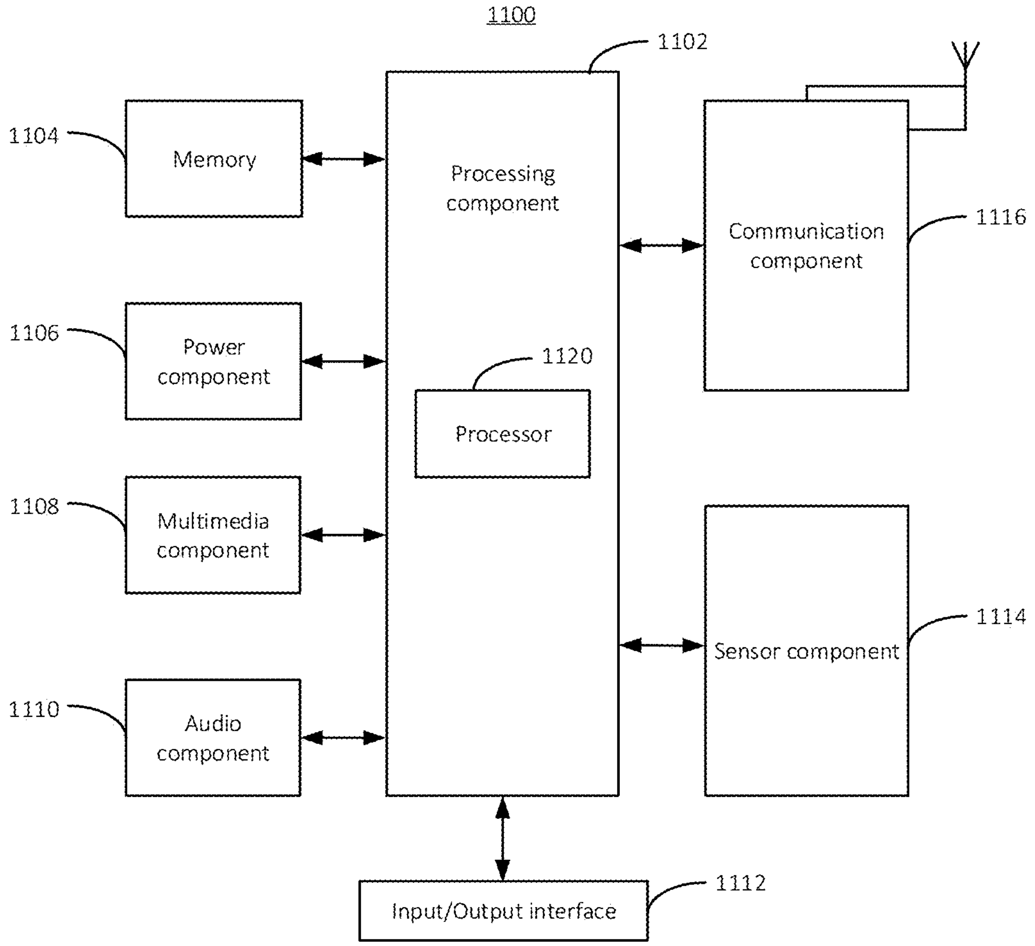
FIG. 11 is a schematic block diagram of an apparatus for transmission control according to an embodiment of the present disclosure.

FIG. 11 is a schematic block diagram of an apparatus 1100 for transmission control according to an embodiment of the present disclosure. For example, the apparatus 1100 may be a mobile phone, a computer, a digital broadcasting terminal, a messaging device, a game console, a tablet device, a medical device, a fitness device, a personal digital assistant, or the like.

Referring to FIG. 11, the apparatus 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 usually controls the overall operations of the apparatus 1100, such as operations associated with display, telephone call, data communication, camera operation, and recording operation. The processing component 1102 may include one or more processors 1120 for executing instructions, so as to complete all or some of the steps in the transmission control method performed by a terminal. In addition, the processing component 1102 may include one or more modules to facilitate the interaction between the processing component 1102 and other components. For example, the processing component 1102 may include a multimedia module to facilitate the interaction between the multimedia component 1108 and the processing component 1102.

The memory 1104 is configured to store various types of data to support the operations at the apparatus 1100. Examples of these data include instructions for any application or method operated on the apparatus 1100, contact data, phone book data, messages, pictures, videos, and the like. The memory 1104 may be implemented by any type of volatile or non-volatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 1106 provides power for the various components of the apparatus 1100. The power component 1106 may include a power management system, one or more power sources, and other components associated with power generation, management, and distribution of the apparatus 1100.

The multimedia component 1108 includes a screen for providing an output interface between the apparatus 1100 and the user. In some embodiments, the screen may include a liquid crystal display (LCD) and a touch panel (TP). In a case that the screen includes a touch panel, the screen may be implemented as a touch screen to receive input signals from the user. The touch panel includes one or more touch sensors to sense touches, slides, and gestures on the touch panel. The touch sensor may not only sense the boundary of a touch or slide operation, but also detect the duration and pressure associated with the touch or slide operation. In some embodiments, the multimedia component 1108 includes at least one of a front camera or a rear camera. When the apparatus 1100 is in an operation mode, such as a shooting mode or a video mode, the front camera and/or rear camera may receive external multimedia data. Each of the front camera and/or the rear camera may be a fixed optical lens system or have focal length and optical zoom capability.

The audio component 1110 is configured to output and/or input audio signals. For example, the audio component 1110 includes a microphone (MIC), and when the apparatus 1100 is in an operation mode, such as a call mode, a recording mode, and a voice recognition mode, the microphone is configured to receive external audio signals. The received audio signals may be further stored in the memory 1104 or transmitted via the communication component 1116. In some embodiments, the audio component 1110 further includes a speaker for outputting audio signals.

The I/O interface 1112 provides an interface between the processing component 1102 and a peripheral interface module. The peripheral interface module may be a keyboard, a click wheel, a button, or the like. The button may include, but is not limited to, a home button, a volume button, a start button, and a lock button.

The sensor component 1114 includes one or more sensors configured to provide various aspects of status assessment for the apparatus 1100. For example, the sensor component 1114 may detect an on/off state of the apparatus 1100, and relative positioning of components such as a display and a keypad of the apparatus 1100. The sensor component 1114 may also detect a position change of the apparatus 1100 or one component of the apparatus 1100, presence or absence of contact between the user and the apparatus 1100, an orientation or acceleration/deceleration of the apparatus 1100, and a temperature change of the apparatus 1100. The sensor component 1114 may include a proximity sensor configured to detect the presence of nearby objects without any physical contact. The sensor component 1114 may further include an optical sensor such as a CMOS or CCD image sensor, for use in imaging applications. In some embodiments, the sensor component 1114 may further include an acceleration sensor, a gyroscope sensor, a magnetic sensor, a pressure sensor, or a temperature sensor.

The communication component 1116 is configured to facilitate wired or wireless communication between the apparatus 1100 and other devices. The apparatus 1100 may access a wireless network based on communication standards such as WiFi, 2G, 3G, 4G LTE, 5G NR or a combination of them. In an example, the communication component 1116 receives broadcast signals or broadcast related information from an external broadcast management system via a broadcast channel. In an example, the communication component 1116 further includes a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology, and other technologies.

In an example, the apparatus 1100 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, so as to perform the transmission control method performed by a terminal.

In an example, a non-transitory computer-readable storage medium including instructions is further provided, such as a memory 1104 including instructions executable by the processor 1120 of the apparatus 1100 to complete the transmission control method performed by a terminal. For example, the non-transitory computer-readable storage medium may be an ROM, a random access memory (RAM), a CD-ROM, a magnetic tape, a floppy disk, an optical data storage device, or the like.

According to the embodiments of the present disclosure, in a case of configuring a terminal to transmit uplink information based on the TBoMS, a network device may receive the uplink information transmitted, based on the TBoMS, by the terminal over a plurality of slots. Upon receiving uplink information from partial slots of the plurality of slots, the network device decodes the uplink information from the partial slots, and may transmit an early-termination-of-transmission indication to the terminal after decoding the uplink information from the partial slots successfully, to indicate the terminal to terminate the transmission of the uplink information over the plurality of slots based on the TBoMS.

Correspondingly, during transmitting the uplink information over the plurality of slots based on the TBoMS, the terminal may terminate continuing to transmit the uplink information over the plurality of slots based on the TBoMS after receiving an early-termination-of-transmission indication transmitted by the network device. In this way, a waste of terminal resources can be avoided, and a waste of spectrum resources can also be avoided.

A person skilled in the art will readily conceive of other implementations of the present disclosure after considering the specification and practicing the present disclosure. The present disclosure is intended to cover any variations, uses or adaptive changes of the present disclosure. These variations, uses or adaptive changes follow the general principle of the present disclosure and include common general knowledge or conventional technical means in the technical field that are not disclosed in the present disclosure. The specification and the embodiments are merely considered as examples, and the true scope and spirit of the present disclosure are indicated by the claims.

It is be understood that the present disclosure is not limited to the precise structure described above and shown in the accompanying drawings, and various modifications and changes can be made without departing from its scope. The scope of the present disclosure is limited merely by the appended claims.

It is to be noted that in this specification, relational terms such as first and second are used merely to distinguish one entity or operation from another and do not necessarily require or imply that any such actual relationship or sequence exists between these entities or operations. The term "include", "comprise", or any other variation of them is intended to cover a non-exclusive inclusion, so that a process, method, article, or device that includes a list of elements not only includes those elements but also includes other elements that are not expressly listed, or further includes elements inherent to such a process, method, article, or device. In the absence of more restrictions, an element defined by "including a . . . " does not preclude the existence of other identical elements in the process, method, article, or device that includes the element.

The method and the apparatus provided by the embodiments of the present disclosure have been introduced in detail. In this specification, specific examples are applied to describe the principles and implementations of the present disclosure. The descriptions of the embodiments are merely used to help understand the method and core idea of the present disclosure. Moreover, for a person of ordinary skill in the art, changes may be made to the specific implementation and the application scope according to the idea of the present disclosure. In summary, the content in this specification shall not be construed as a limitation to the present disclosure.

The invention claimed is:

1. A transmission control method, performed by a terminal, comprising:

transmitting uplink information to a network device over a plurality of slots based on Transport Block (TB) processing over multi-slot PUSCH (TBoMS); and terminating transmission of the uplink information over the plurality of slots based on the TBoMS in response to receiving an early-termination-of-transmission indication transmitted by the network device, wherein the early-termination-of-transmission indication is carried in downlink control information (DCI); and terminating the transmission of the uplink information over the plurality of slots based on the TBoMS in response to receiving the early-termination-of-transmission indication transmitted by the network device comprises:

terminating the transmission of the uplink information over the plurality of slots based on the TBoMS, in response to receiving the DCI and an HARQ process number (HPN) in the DCI being the same as an HPN of an HARQ process in which the uplink information resides.

2. The transmission control method according to claim 1, further comprising:

performing, on a first resource, the transmission of the uplink information over the plurality of slots based on the TBoMS, wherein the first resource comprises a configured grant resource, wherein a frequency domain resource in the configured grant resource comprises at least one of:

a frequency domain resource in an unlicensed spectrum; or a frequency domain resource in a licensed spectrum.

3. The transmission control method according to claim 1, wherein terminating the transmission of the uplink information over the plurality of slots based on the TBoMS comprises:

terminating the transmission of the uplink information over the plurality of slots based on the TBoMS after a first number of time units after receiving the early-termination-of-transmission indication.

4. The transmission control method according to claim 3, further comprising:

clearing cache corresponding to the uplink information within the first number of time units.

5. The transmission control method according to claim 3, wherein the first number is determined according to at least one of:

a protocol-based agreement; or a capability of the terminal.

6. The transmission control method according to claim 5, wherein the first number is determined according to the configuration by the network device, and the transmission control method further comprises:

transmitting processing capability information of the terminal to the network device.

7. The transmission control method according to claim 6, wherein the processing capability information comprises at least one of a rate at which the terminal parses the early-termination-of-transmission indication, or a rate at which the terminal clears cache corresponding to the uplink information.

8. The transmission control method according to claim 1, wherein terminating the transmission of the uplink information over the plurality of slots based on the TBoMS, in response to receiving the DCI and the HPN in the DCI being the same as the HPN of the HARQ process in which the uplink information resides comprises:

terminating the transmission of the uplink information over the plurality of slots based on the TBoMS, in response to receiving the DCI, the HPN in the DCI being the same as the HPN of the HARQ process in which the uplink information resides, and a new data indicator (NDI) field in the DCI being flipped.

9. The transmission control method according to claim 1, further comprising determining scheduling information for new data transmission according to the DCI.

10. A communication apparatus, comprising:

a processor; and a memory configured to store a computer program;

wherein the computer program, when executed by the processor, causes the processor to perform the transmission control method according to claim 1.

11. A transmission control method, performed by a network device, comprising:

receiving uplink information transmitted by a terminal over a plurality of slots based on Transport Block (TB) processing over multi-slot PUSCH (TBoMS);

decoding, upon receiving uplink information from partial slots of the plurality of slots, the uplink information from the partial slots; and transmitting an early-termination-of-transmission indication to the terminal in response to decoding the uplink information from the partial slots successfully, to indicate the terminal to terminate the transmission of the uplink information over the plurality of slots based on the TBoMS, wherein the early-termination-of-transmission indication is carried in downlink control information (DCI), and an HARQ process number (HPN) in the DCI is the same as an HPN of an HARQ process in which the uplink information resides.

12. The transmission control method according to claim 11, further comprising:

configuring a first number for the terminal, to indicate the terminal to terminate the transmission of the uplink information over the plurality of slots based on the TBoMS after the first number of time units after receiving the early-termination-of-transmission indication.

13. The transmission control method according to claim 12, further comprising:

receiving processing capability information transmitted by the terminal, wherein the first number is determined based on the processing capability information.

14. The transmission control method according to claim 13, wherein the processing capability information comprises at least one of a rate at which the terminal parses the early-termination-of-transmission indication, or a rate at which the terminal clears cache corresponding to the uplink information.

15. The transmission control method according to claim 11, wherein a new data indicator (NDI) field in the DCI is flipped.

16. The transmission control method according to claim 11, wherein the DCI carries scheduling information for new data transmission or does not carry scheduling information for new data transmission.

17. The transmission control method according to claim 11, wherein the transmission, by the terminal, of the uplink information over the plurality of slots based on the TBoMS is performed on a first resource, and wherein the first resource comprises:

a configured grant resource, wherein a frequency domain resource in the configured grant resource comprises at least one of:

a frequency domain resource in an unlicensed spectrum; or a frequency domain resource in a licensed spectrum.

18. A communication apparatus, comprising:

a processor; and a memory configured to store a computer program;

wherein the computer program, when executed by the processor, causes the processor to perform the transmission control method according to claim 11.

* * * * *